United States Patent [19]

Kahoun

[11] 3,988,002
[45] Oct. 26, 1976

[54] IN-LINE BALANCE VALVES
[75] Inventor: Frank Kahoun, Warehouse Point, Conn.
[73] Assignee: United Technologies Corporation, Hartford, Conn.
[22] Filed: July 10, 1972
[21] Appl. No.: 270,385

[52] U.S. Cl. ............................................. 251/282
[51] Int. Cl.² ....................................... F16K 39/00
[58] Field of Search .................. 251/282, 122, 281; 239/417.3

[56] References Cited
UNITED STATES PATENTS

| | | | |
|---|---|---|---|
| 933,468 | 9/1909 | Koenig | 251/282 X |
| 2,297,082 | 9/1942 | Staats | 251/282 X |
| 2,365,905 | 12/1944 | Rheingans | 251/282 X |
| 2,391,531 | 12/1945 | Warren | 251/282 |
| 2,630,292 | 3/1953 | Skweir | 251/282 |
| 2,845,948 | 8/1958 | Parker | 251/281 X |
| 3,721,387 | 3/1973 | Wilmot, Jr. | 239/417.3 X |

Primary Examiner—Charles J. Myhre
Assistant Examiner—Ira S. Lazarus
Attorney, Agent, or Firm—Norman Friedland

[57] ABSTRACT

An enclosed hollow plug having a plurality of discretely located apertures, for an in-line valve cooperating with an opening for adjusting its area wherein the apertures are so sized and located that flow into and out of the hollow plug creates a pressure therein that varies for counterbalancing the pressure acting on the portion of the plug adjacent the opening to hold the net pressure force at zero.

1 Claim, 1 Drawing Figure

IN-LINE BALANCE VALVES

BACKGROUND OF THE INVENTION

This invention relates to in-line valves and particularly to means for balancing the valves so as to reduce or minimize the pressure loading thereon.

This invention constitutes an improvement over the ejector disclosed in U.S. patent application Ser. No. 149,134 filed one June 2, 1971 now Pat. No. 3,721,387 entitled "Ejector With Variable Mixing Section and Primary Nozzle Areas" by George E. Wilmot, Jr. and assigned to the same assignee. As shown in this patent application surpra the plug moves relative to the primary nozzle of the ejector in order to vary its area. The problem encountered with this type of ejector plug and construction is that when the plug moves open relative to the ejector nozzle the integrated pressure force acting on the upstream side of the plug evidences a sudden and relatively large reduction in force which adversely affects the actuator that positions the plug.

I have found that I can eliminate or minimize the change of net force caused by the pressures acting on the plug and hence obviate the problem of the sudden drop in force by incorporating a series of discretely located aperatures in the hollow plug so spaced as to permit air to flow in and out thereof for creating an internal pressure and hence a force which force balances the force created by the integrated pressure acting on the upstream portion of the plug. Thus, as the plug is moved to open or close the adjacent nozzle opening the pressure in the balanced chamber changes similarly to the integrated pressure acting on the upstream side of the plug so that the net force change on the plug is zero, or substantially zero. This is accomplished by virtue of the fact that the location of the holes are at such intervals that the varying external pressure distribution will cause the balance pressure to be equal to the integrated pressure distribution at all plug positions. In this manner the uniquely placed holes serves to obtain a balanced pressure to match the pressure versus flow characteristics desired, and since the balanced pressure obtained is a function of the magnitude of the inlet pressure the ratio of the integrated pressure and balance pressure remains constant notwithstanding changes of the inlet pressure.

SUMMARY OF THE INVENTION

An object of this invention is to provide an improved in-line valve.

A still further object of this invention is to provide for an in-line valve means for balancing the valve against external pressure forces acting on the upstream portion of the valve element so that the net force change on the plug is substantially zero.

A still further object of this invention is to provide for a balanced in-line valve as described, a plurality of discretely positioned apertures in the valve plug to communicate with an enclosed cavity formed therein in such a manner that the flow into and out of the cavity varies the pressure distribution when the plug is positioned between opened and closed positions.

Other features and advantages will be apparent from the specification and claims and from the accompanying drawings which illustrate an embodiment of the invention.

DESCRIPTION OF THE PREFERRED EMBODIMENTS

While this invention is shown in its preferred embodiment as being utilized in an ejector as will be apparent to one ordinarily skilled in this art it can be utilized in other types of in-line plug valve designs.

Figure 1:
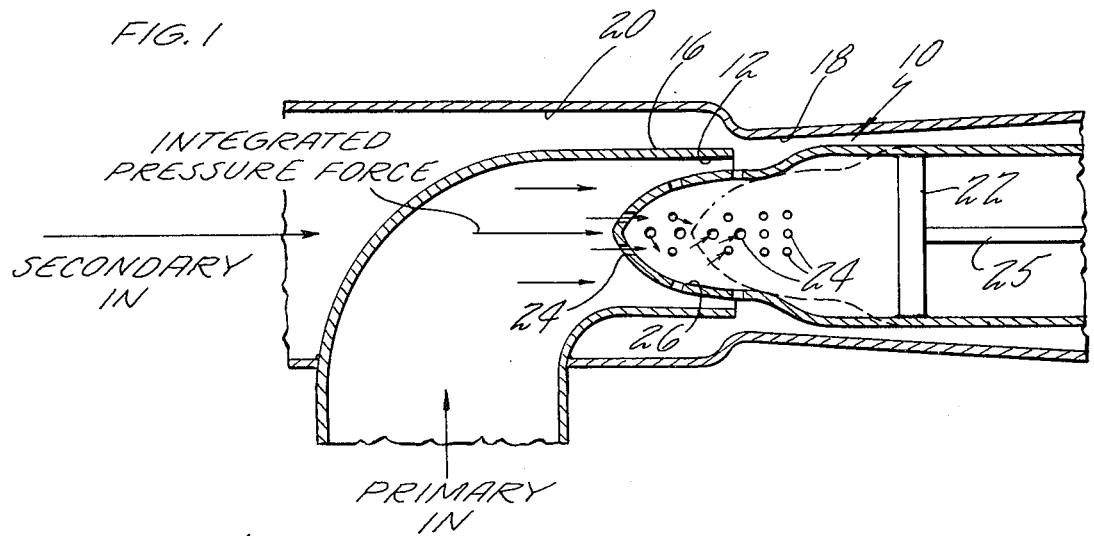
FIG. 1 is a view partly in sectional and partly in phantom illustrating the details of this invention.

Referring to FIG. 1 the in-line plug generally illustrated by numeral 10 serves to adjust the area of the opening 12 of the primary nozzle 16 which discharges air or fluid into the mixing section 18 of the ejector. Typically of ejectors the flow through the primary nozzle serves to increase the flow through the secondary nozzle generally illustrated by numeral 20. For further details of this embodiment reference should be made to the patent application Ser. No. 149,134 incorporated by reference herein. For the purpose of an understanding of this invention it is only significant to appreciate that plug 10 is positioned relative to opening 12 by virtue of the connecting arms 22 and 24 which are suitably connected to a suitable actuator (not shown).

In accordance with the present invention a plurality of aperatures 24 are judiciously spaced on the upstream side of the plug so that they are in proximity to the opening 12 and the mixing chamber 18. These holes are spaced to permit air to flow in and out of the hollow cavity 26 of plug 10 so as to obtain a pressure force in the hollow cavity 26 which is equal to the integrated pressure force on the upstream portion of the plug. Thus, as the plug is moved from open to closed positions the pressure in the balance chamber or cavity 26 also changes so that the net force charge on the plug remains zero. This is accomplished by the proper sizing and locationing of the holes at discrete intervals along the plug so that the varying external pressure distribution will cause the balance pressure to be equal to the integrated pressure distribution at all plug positions.

Figure 2:
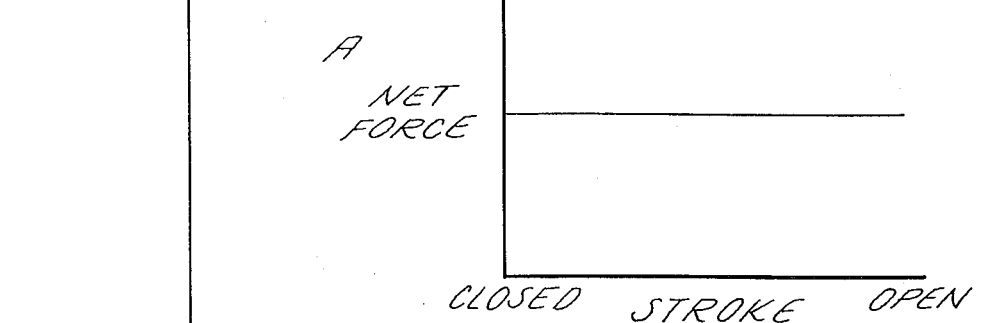
FIGS. 2, A, B, and C are graphical illustrations showing the pressure or force acting on the plug for varying stroke positions.
Figure 2:
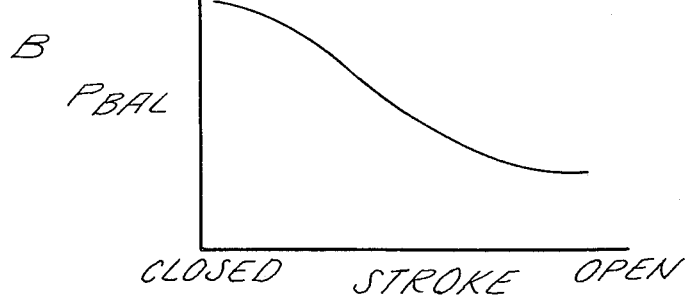
Figure 2:
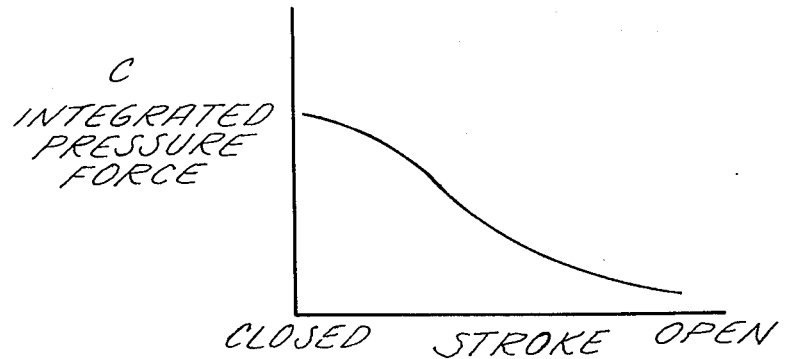

The location and size of the plurality of holes are either theoretically calculated or may be obtained by trial and error or a combination thereof. Accordingly the hole sizes and locations are selected so that they create a balance pressure to fit the pressure versus stroke characteristics desired. Thus, the balanced pressure ($P_{BAL}$) versus stroke characteristic as illustrated in FIG. 2A is designed to match the integrated pressure force versus stroke characteristic as shown in FIG. 2C such that the sum of the two will give a constant net force as shown in FIG. 2A. Since the balanced pressure obtained is a function of the magnitude of the inlet pressure, the ratio of the integrated pressure force and balance pressure remains constant as the inlet pressure level changes.

It is apparent from the foregoing that since the net force change remains at a constant value as is evident by FIG. 2A the sudden change in integrated pressure force as is evidenced by the curve illustrated in FIG. 2B will not adversely effect the actuator which was the situation heretofore.

What has been shown by this invention is means for holding the net force change on a plug type of in-line value at or substantially zero.

The holes are placed on in-line valves to minimize flow forces on valve body, allowing use of plug valves for modulating controls where normally they can not be used because of large flow forces. The holes placed axially along plug valves such that holes see a verying pressure distribution as the plug is opened or closed. By varying the size of a series of axially placed holes on the plug valve such that as the plug is moved, the area of holes exposed to external pressures varies.

It should be understood that the invention is not limited to the particular embodiments shown and described herein, but that various changes and modifications may be made without departing from the spirit or scope of this novel concept as defined by the following claims.

I claim:
1. An ejector for inducing the flow through a duct, a primary duct having a primary nozzle terminating into said duct and having the axis of said primary nozzle in line with the flow in said duct, a hollow plug in said duct movable in relation to said primary nozzle and having at least a portion thereof extending a distance into said primary duct for varying the area of said primary nozzle, means for pressure balancing said plug over its entire operating range from full open to full closed including a plurality of holes judiciously located and sized to allow fluid upstream thereof in the primary duct to be admitted into said hollow plug and to discharge into said duct downstream of said primary nozzle, the size and location of said holes being such that the integrated pressure acting internally and externally of said hollow plug substantially equal zero.

* * * * *